United States Patent [19]

Kawano et al.

[11] Patent Number: 5,404,471
[45] Date of Patent: Apr. 4, 1995

[54] METHOD AND APPARATUS FOR SWITCHING ADDRESS GENERATION MODES IN CPU HAVING PLURAL ADDRESS GENERATION MODES

[75] Inventors: Seiichi Kawano, Machida; Hirohide Komiyama, Zama; Shuichi Mukohyama, Yamato, all of Japan

[73] Assignee: International Business Machines Corp., Armonk, N.Y.

[21] Appl. No.: 14,892

[22] Filed: Feb. 8, 1993

[30] Foreign Application Priority Data

Nov. 20, 1992 [JP] Japan .................................. 4-034842

[51] Int. Cl.⁶ .............................................. G06F 9/06
[52] U.S. Cl. .................................. 395/375; 364/946.2; 364/262.4
[58] Field of Search ................ 395/375, 800, 775

[56] References Cited

U.S. PATENT DOCUMENTS

| | | | |
|---|---|---|---|
| 4,747,040 | 3/1988 | Blanset | 395/650 |
| 4,899,275 | 2/1990 | Sachs | 395/425 |
| 4,972,316 | 11/1990 | Dixon | 395/425 |
| 5,083,259 | 1/1992 | Maresh | 395/325 |
| 5,150,472 | 9/1992 | Blank | 395/425 |
| 5,168,557 | 12/1992 | Shibuya | 395/375 |
| 5,265,237 | 11/1993 | Tobias | 395/500 |

*Primary Examiner*—David Y. Eng
*Attorney, Agent, or Firm*—Robert S. Babayi

[57] ABSTRACT

A data processing system has a microprocessor that is operable in real and protected address generation modes. Transition from the real mode to the protected mode is done by initializing system tables and pointer registers, switching from the real mode to the protected mode, and flushing a prefetch queue before executing further instructions in the protected mode. The transition also includes flushing instructions from the prefetch queue, immediately after the initializing, and executing at least one instruction while prefetching additional instructions that are executed to complete the transition.

13 Claims, 4 Drawing Sheets

METHOD AND APPARATUS FOR SWITCHING ADDRESS GENERATION MODES IN CPU HAVING PLURAL ADDRESS GENERATION MODES

BACKGROUND OF THE INVENTION

This invention relates to the field of data processing, and, more particularly, to a method and apparatus for switching address generation modes in a data processing system having a central processing unit (CPU) operable with plural address generation modes.

Some CPUs or microprocessors, of a data processing system such as a personal computer, operate in plural address generation modes (addressing modes). For example, an Intel 386 (a trademark of Intel) microprocessor has two address generation modes called a real mode and a protected mode. The protected mode is divided into a paging protected mode which uses a paging function, and a non-paging mode in which the paging function is disabled. In the real mode, a value obtained from shifting a value of a CS (Code Selector) register by four bits to the left is added to an value of an IP (Instruction Pointer) register to generate a physical address. In the paging protected mode, a value of the CS is used as a pointer to a segment descriptor in a segment descriptor table. The segment descriptor table is formed in system memory. A base address contained in the segment descriptor pointed to by the CS is added to a value of the IP to generate a physical address. The paging function is performed only in the protected mode. In page conversion, an address (linear address) before the page conversion, is converted to an physical address by specifying a page table and an offset in the page table.

FIG. 3 shows an overview configuration of an Intel 386 CPU 10 which comprises six functional units. A bus interface unit 1 is an interface between the inside and outside of the CPU and accepts a fetch request from an instruction prefetch unit 2 and an execution unit 3. The instruction prefetch unit 2 fetches an instruction by using the bus interface unit 1 when the bus interface unit 1 is not involved in a bus cycle. The prefetched instruction is stored in a prefetch queue 2A of 16-byte length and waits for processing by the execution unit 3. Since the priority of bus access for prefetch is lower than that of data transfer preceded by the execution of an instruction by the execution unit 3, the execution of the instruction would not be delayed even if a prefetch function is provided. In the case where data transfer does not occur, if the prefetch queue 2A is not full of prefetched instructions, the instruction prefetch unit 2 prefetches an instruction using a bus cycle. On the other hand, if the prefetch queue 2A is full of prefetched instructions, the CPU becomes idle.

An instruction decode unit 4 removes an instruction from the prefetch queue 2A and converts it to a microcode, that is, decodes it. The decoded instruction is stored in an instruction queue 4A and waits for processing by the execution unit 3. Up to three instructions can be stored in the instruction queue 4A. The execution unit 3 executes instructions stored in the instruction queue 4A. A segmentation unit 5 converts a logical address, formed by the contents of the CS (Code Selector) and the IP (Instruction Pointer) into a 32-bit linear address of the next instruction to be executed. The CS and the IP respectively store the code segment address and offset, and are a part of a register group 3A in the execution unit 3. If the paging function is enabled, a paging unit 6 converts the linear address from the segmentation unit to a physical address. However, if the paging is not enabled, such conversion is not needed since the linear address is the same as the physical address. The paging unit 6 passes the physical address to the bus interface unit 1.

When the microprocessor is first powered up or reset, it operates in the real mode. The following steps are required to switch CPU 10 from the real mode to the paging protected mode. First, system tables in memory are initialized and registers are loaded with pointers to such tables. As shown in FIG. 4, step 11 loads or sets up the GDTR (Global Description Table Register)(not shown) of the CPU with a pointer to a GDT (Global Description Table). Step 12 loads or sets up CR3 (one of the control registers in group 3A) with a pointer to a page conversion table. Step 15 sets the CR0 control register to enable both the PE (protection enable) bit and the PG (paging enable) bit of the CR0 control register, as shown in FIG. 5. Step 15 thereby causes entry into the paging protected mode. Step 16 flushes instructions from prefetch queue 2A and sets the CS and the IP to valid values for the nest instruction to be executed. Afterwards, succeeding instructions complete conventional transitional steps to operate in the paging protected mode. A series of instructions for performing such steps are shown in FIG. 6.

With reference to FIG. 6, "LGDT MEMORY ADDRESS" is an instruction for writing or loading the pointer to the GDT from such memory address into the GDTR. "MOV EAX, MEMORY ADDRESS" and "MOV CR3,EAX" are instructions for moving the pointer to the page conversion table from the memory address thereof to the EAX register from the memory address and then transferring the pointer into the CR3 register. "MOV EAX, MEMORY ADDRESS" and "MOV CR0,EAX" are instructions for moving a value for setting the CR0 register, into the EAX register from the memory address and then transferring such value into the CR0 register. Such value enables both the PE and PG bits of the CR0 register thereby causing the address generation mode to switch and enter the paging protected mode. The CR0 and CR3 registers, etc. are a part of the register group 3A.

In the above steps for switching the address generation mode, when both the PE and PG bits of the CR0 register are enabled, transition of the address generation mode is not completed. To ensure that the address generation mode becomes completely switched, the "JMP OFFSET VALUE, SELECTOR VALUE" must be executed to flush the prefetch queue 2A and load the CS and IP with valid values of the code segment base address and offset for the next instruction to be executed. Such jump is an intersegment jump.

The normal transition from one address generation mode to another, requires two conditions to be satisfied. These conditions are (a) a linear address accords with a physical address, and (b) a page for the linear address exists (the address to be fetched resides in real memory). It is possible for an operating system (OS) program, which performs memory control, to satisfy the above conditions, but it is impossible for a program, such as a device driver program for controlling a suspend/resume mechanism which does not perform memory control, to satisfy such conditions If the conditions (a) and (b) are not satisfied, an attempt to switch the address generation mode may cause a problem that the system will not operate normally. Such problem is caused when the CPU executes the instruction "MOV CR0,EAX" for switching the address generation mode and then tries to prefetch the next instruction "JMP OFFSET VALUE, SELECTOR VALUE" in the above example. The problem is not caused if the instruction "JMP OFFSET VALUE, SELECTOR VALUE" is already prefetched into the CPU at the time when the instruction "MOV CR0,EAX" is executed by the CPU.

A prefetch address is calculated based on current values in the CS and IP. However, if the current values of the CS and IP are the same, the prefetch address (i.e., the memory address at which an instruction to be fetched from is stored) would be different for each address generation mode since the mechanism for generating a physical address from a logical address is different for each address generation mode. Therefore, after a mode is switched by the execution of "MOV CR0,EAX", the prefetch address calculated based on the CS and IP would be different from the prefetch address based on the same CS and IP values before the transition between the modes. This causes control to be transferred to an incorrect address and system hang up to occur, or the system to malfunction or stop if a page corresponding to the calculated address does not exist.

A data processing system, such as a battery-driven notebook personal computer, usually provides a suspend/resume mechanism. However, for 386 CPUs and the like, if the suspend state occurs during the operation of system in the protected mode, the system operates in the real mode at the time of resume, after power supply to the 386 CPU and the like is turned off. Therefore, the real mode must be switched to the protected mode for each resume by a device driver program for controlling the suspend/resume mechanism. This is the reason why it is especially hoped to solve above mentioned problem.

SUMMARY OF THE INVENTION

The principal object of the invention is provide an improved methods and apparatus for switching address generation modes in an error-free manner, in a data processing system having a CPU that operates with plural address generation modes such as real and protected modes.

Another object is to provide improved method an apparatus for switching between real and protect modes in such a manner as to avoid the problems noted above.

Briefly, in accordance with the invention, a data processing system has a microprocessor that is operable in real and protected address generation modes. Transition from the real mode to the protected mode is done by initializing system tables and pointer registers, switching from the real mode to the protected mode, and flushing a prefetch queue before executing further instructions in the protected mode. The transition also includes flushing instructions from the prefetch queue, immediately after the initializing, and executing at least one instruction while prefetching additional instructions that are executed to complete the transition.

DRAWINGS

Other objects and advantages of the invention will be apparent from the following description taken in connection with the accompanying drawings wherein.

DETAILED DESCRIPTION

Figure 1:
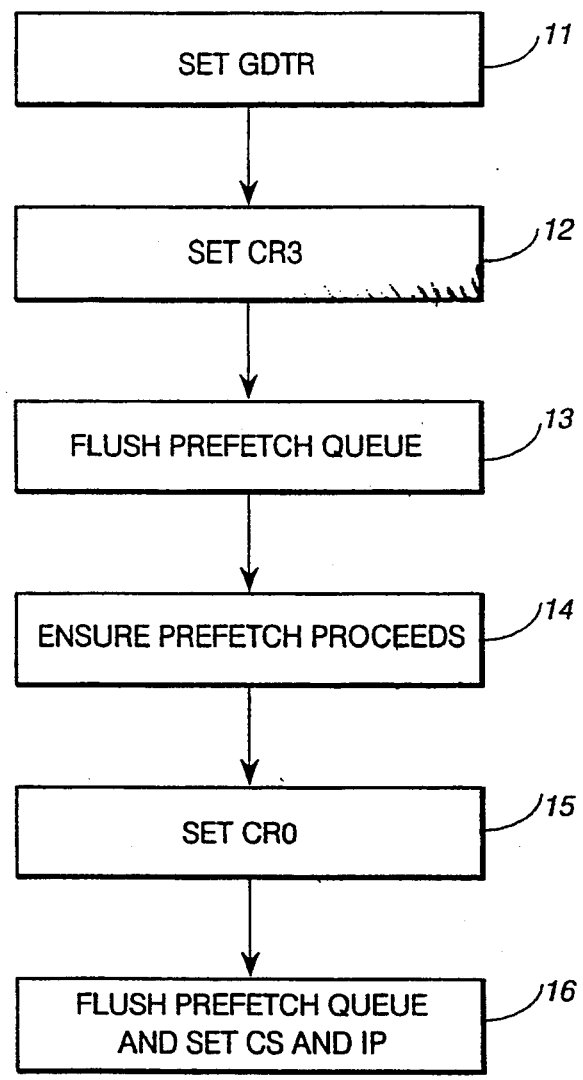
FIG. 1 is a flow chart showing steps in an embodiment of a method for switching address generation mode in a data processing system, according to the present invention.

Referring to FIG. 1, there is shown an embodiment of a method for switching address generation modes according to the present invention. As compared with the steps of FIG. 3, steps 11, 12, 15, and 16 in FIG. 1 are the same as the same numbered steps in FIG. 4, but the method of FIG. 1 adds steps 13 and 14 between steps 12 and 15 of FIG. 4. Step 13 flushes from the prefetch queue 2A any instructions stored therein prior to step 13 being performed. To flush prefetch queue 2A, an instruction, such as unconditional jump or a call for changing sequential access to another instruction at a noncontiguous data storage location of memory 20, is used. Step 14 ensures that prefetching proceeds or occurs by providing a time period during which such prefetching can be done. Prefetching is done by instruction prefetch unit 2 when bus interface unit 1 is not involved in a bus cycle. Therefore, step 14 executes instructions which are internal to the execution unit and do not cause a bus cycle. This allows instruction prefetch unit 2 to fill prefetch queue 2A with new instructions including the ones for performing steps 15 and 16.

Figure 2:
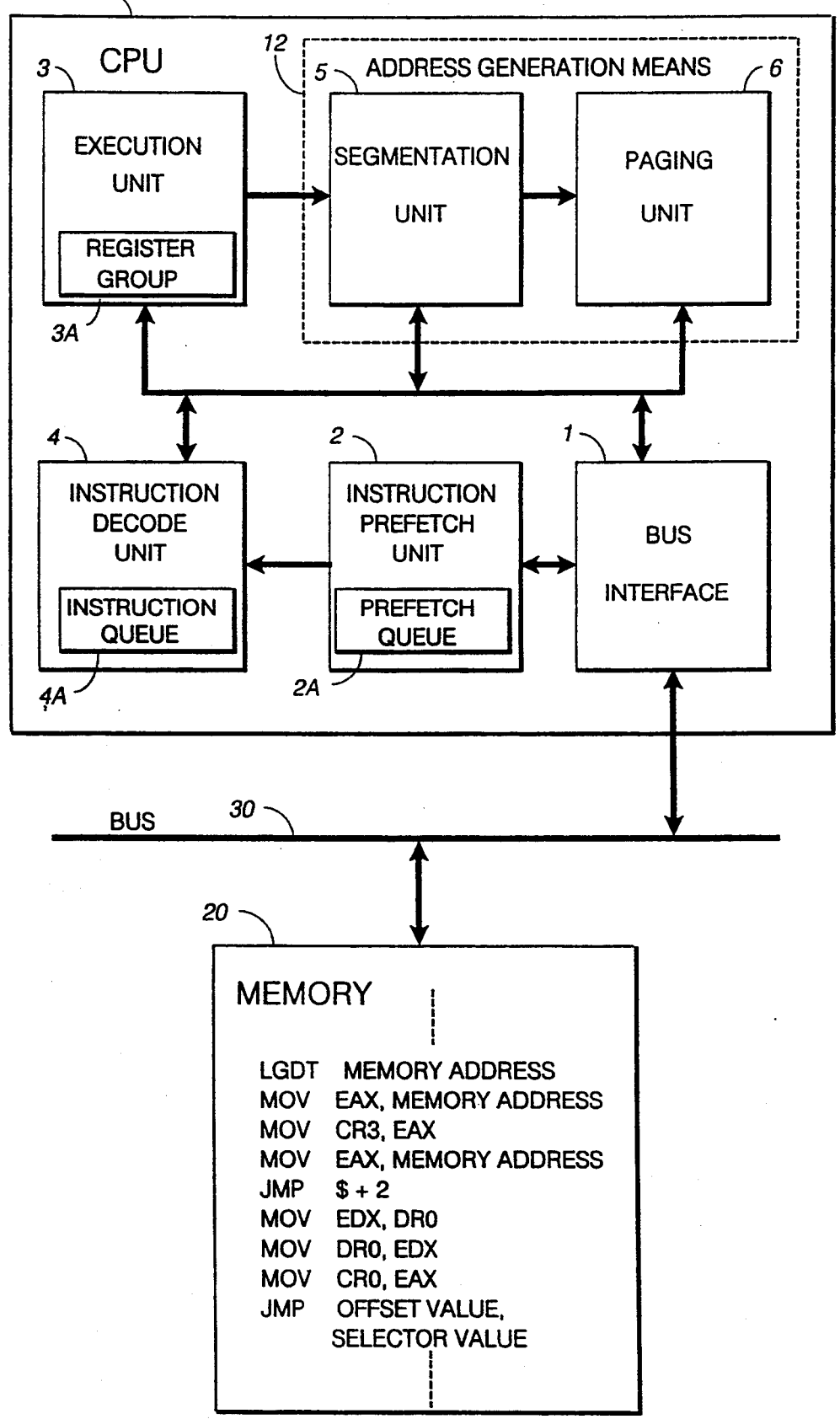
FIG. 2 is a block diagram of data processing apparatus showing an example of a series of instructions which execute the steps of the method embodiment shown in FIG. 1.

FIG. 2 shows the general configuration of an embodiment of data processing apparatus according to the present invention. In the data processing system of FIG. 2, CPU 10 and main memory 20 are connected to each other, through a bus 30. Address generation means 12 of the CPU 10 comprises segmentation unit 5 and paging unit 6.

Figure 5:
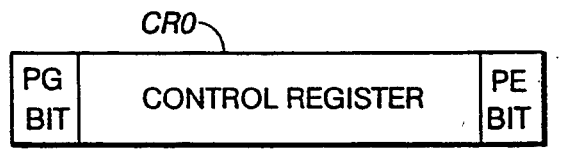
FIG. 5 is a block diagram showing the configuration of a control register of the CPU.
Figure 6:
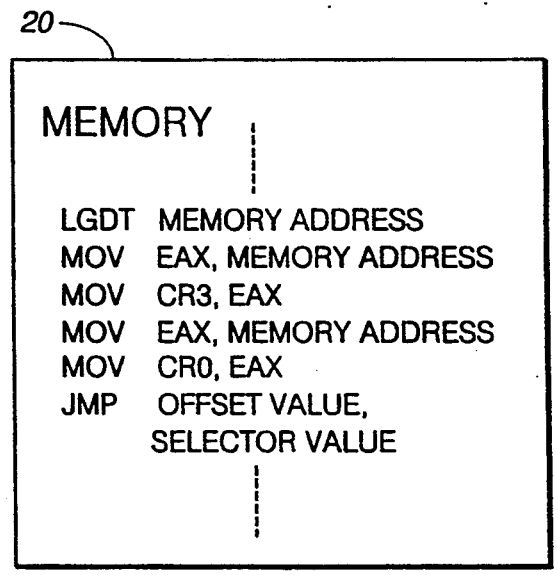
FIG. 6 is a block diagram showing an example of a series of instructions which execute the steps in the prior art method of FIG. 4.

As compared with the series of instructions shown in FIG. 5, the series of instructions in memory 20 in FIG. 2, includes the addition of the following instructions placed between the second "MOV EAX, MEMORY ADDRESS" instruction and the "MOV CR0,EAX" instruction:

JMP $+2
MOV EDX,DR0
MOV DR0,EDX

"JMP $+2" is an example of an instruction for performing step 13. This instruction increases the value of the IP register by two bytes. Since 'JMP $+2' itself has a machine code size of two bytes, the execution of "JMP $+2" causes CPU 10 to jump to the storage location of the next instruction 'MOV EDX,DR0'. When the "JMP $+2" is executed, prefetch queue 2A is flushed. Once the queue is flushed, instruction prefetch unit 2 begins fetching new instructions beginning with the target of the jump instruction.

Figure 3:
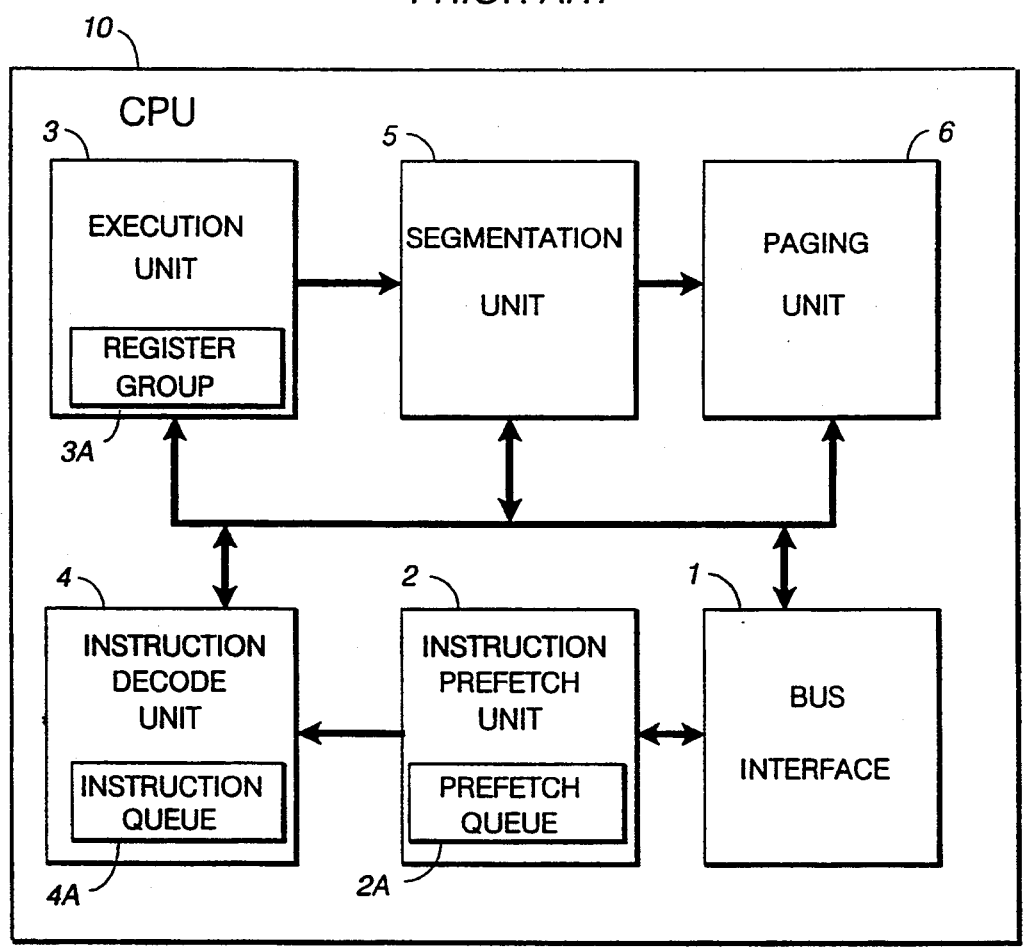
FIG. 3 is a block diagram of a 386 CPU used in the invention.
Figure 4:
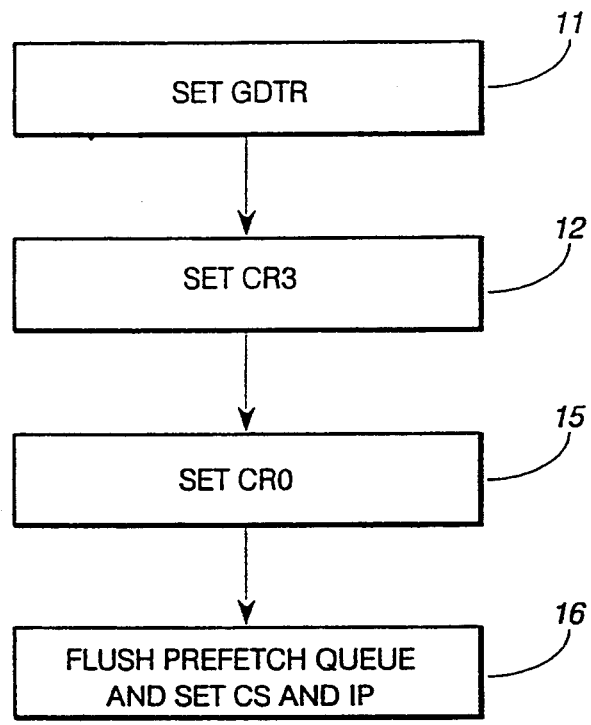
FIG. 4 is a flow chart showing prior art steps for switching between address generation modes.

"MOV EDX,DR0" and the next "MOV DR0,EDX" are examples of instructions for the execution of the step 14 in FIG. 3. "MOV EDX,DR0" is a register-to-register transfer instruction for transferring the contents of the DR0 register to the EDX register. The next instruction "MOV DR0,EDX" is a register-to-register transfer instruction for transferring the content of the EDX register to the DR0 register. Accordingly, the execution of "MOV EDX,DR0" and "MOV DR0,EDX" instructions causes the contents of the DR0 register to returned to the DR0 register after an initial transfer to the EDX register. The execution of such instructions is internal within the execution unit and does not cause a bus cycle nor access to the bus 30. Such execution thus provides a time period during which instruction prefetch unit 2 can fetch new instructions into prefetch queue 2A. The new instructions that are loaded into the prefetch queue include the "MOV CR0,EAX" and "JMP OFFSET VALUE, SELECTOR VALUE" instructions.

The size (depth) of prefetch queue 2A is sufficient to ensure the "JMP OFFSET VALUE, SELECTOR VALUE" instruction is stored in a storage location following the location at which the "MOV DR0,EDX" instruction is fetched into the prefetch queue 2A during the execution of the "MOV EDX,DR0" and "MOV DR0,EDX" instructions.

Thus, when the mode transition instruction ("MOV CR0,EAX") is being executed, the next instruction ("JMP OFFSET VALUE, SELECTOR VALUE") to be executed has already been fetched into the prefetch queue 2A with the correct address of the next instruction. Thus, a system hang up, which originates in the transfer of control to an erroneous address, can not occur immediately after the mode transition, and the system does not malfunction or stop in the case where a page corresponding to a calculated address does not exist.

The mode transition can be normally executed even if the above conditions (a) and (b) are not satisfied. Therefor, the mode transition can be normally executed independently of the function of the operating system. In a data processing system including a suspend/resume mechanism in which a transition the real mode to the protected mode is needed for each resume, the present invention has the advantage that the resume function can be normally executed without any error occurring.

In the illustrated embodiment, a JMP (unconditional jump instruction) is used to flush the prefetch queue. However, it is to be appreciated that other instructions for flushing the prefetch queue may be used, such as other jump instructions or a call instruction. Generally, instructions for flushing the prefetch queue, transfer control to noncontiguous memory addresses.

Further, in the embodiment, preread instructions are retained in the prefetch queue during the execution of the register-to-register transfer between the DR0 and EDX registers. However, it should also be appreciated that other instructions may be executed which do not prevent prefetch, such as other register-to-register transfer instructions or an instruction other than register-to-register transfer instructions, to ensure that the preread instructions are retained in the prefetch queue.

It should be apparent to those skilled in the art that many changes can be made in the details and arrangements of steps and parts without departing from the scope of the invention as defined in the appended claims.

What is claimed is:

1. In a data processing system (DPS) comprising a microprocessor, a system bus and a memory connected to said microprocessor, via said system bus, for storing system tables and instructions to be executed by said microprocessor; said microprocessor being operable in a first addressing mode and a second addressing mode comprising an execution unit having a plurality of execution unit registers, a prefetch queue for storing prefetched instructions, a code selector register, and an instruction pointer register and at least one settable control register for selecting the addressing mode under which the microprocessor operates; a method for operating said DPS system comprising steps of:
   (a) initializing said system tables,
   (b) flushing instructions from said prefetch queue during a first time period, said first time period occurring immediately after step (a), which instructions had been prefetched prior to said first time period;
   (c) executing at least one instruction after step (b);
   (d) after the first time period and while said one instruction of step(c) is being executed, fetching instructions for sequentially performing the following steps:
   (d) (1) setting the control register to select one of the addressing modes;
   (d) (2) flushing prefetched instructions from said prefetch queue during a second time period occurring after the first time period, and
   (d)(3) setting said code selector register and said instruction pointer register.

2. The method according to claim 1, wherein said first addressing mode is a default real mode; and said second addressing mode is a selectable protected mode; and said step (d) (1) comprises a step of setting said control register for operating under the selectable protected mode 3. The method according to claim 2, wherein step (b) of flushing instructions from the prefetch queue comprises an step of executing an instruction for changing sequential access to another instruction in a non-contiguous data location in the system memory.

4. The method according to claim 3 wherein said step (b) is performed by executing a jump instruction to a memory location having stored therein an address for an instruction for performing the step (d) (1).

5. The method according to claim 3, wherein said step (c) is performed by executing at least one instruction for moving data between said execution unit registers.

6. A DPS according to claim 2 wherein said step (c) of performing one instruction comprises the step of performing an instruction which dose not result in generation of an activity over the system bus.

7. A data processing system (DPS) operable in a first addressing mode and in a second addressing mode comprising:
   a microprocessor,
   a System bus;
   a memory connected to said microprocessor, via said system bus, for storing system tables and instructions to be executed by said microprocessor; said microprocessor comprising:
   an execution unit having a plurality of execution unit registers,
   an instruction prefetch unit including a prefetch queue for storing prefetched instructions, a code selector register, and an instruction pointer register; said microprocessor including initialization means for initializing said system tables, and flushing means for flushing instructions from said prefetch queue, immediately after said initializing means has initialized said system tables, which instruction had been prefetched prior to system table initialization means (e);

said execution unit being responsive to completion of flushing of instructions from said prefetch queue for executing at least one instruction, and said instruction prefetch unit being responsive to completion of flushing of instructions from said prefetch queue for prefetching an address mode selection instruction while said one instruction is being executed by said execution unit; said address mode selection instruction comprising an instruction for selecting an address mode for the DPS.

8. A DPS according to claim 7, wherein said first address mode is a default real addressing mode; and said second mode is a selectable protected mode; and wherein said address mode selection instruction comprising an instruction for selecting the selectable protected mode.

9. A DPS according to claim 8 wherein said DPS further comprises a selectively settable control register for selecting one of said address modes; and wherein said address mode selection instruction comprises an instruction for setting the control register to operate in said selectable protected addressing mode.

10. A DPS according to claim 7, wherein said first flushing means comprises executing, by said execution means, a flushing instruction which changes a current instruction address to a subsequent instruction address; wherein said current instruction address and said subsequent instruction address are located at non-contiguous memory locations.

11. A DPS according to claim 10, wherein said flushing instruction comprises a jump instruction to said subsequent instruction address; and wherein said subsequent instruction address comprises the instruction address for the address mode selection instruction.

12. A DPS according to claim 7, wherein said one instruction comprises an instruction that does not result in generation of an activity over the system bus.

13. A DPS according to claim 12, wherein said one instruction comprises an instruction for moving data solely within said execution unit registers.

* * * * *